Sept. 3, 1968 H. HEITMANN 3,400,224

TIME SCAN NETWORK SEARCH

Filed July 8, 1965 3 Sheets-Sheet 1

Sept. 3, 1968 H. HEITMANN 3,400,224

TIME SCAN NETWORK SEARCH

Filed July 8, 1965 3 Sheets-Sheet 2

Sept. 3, 1968 H. HEITMANN 3,400,224

TIME SCAN NETWORK SEARCH

Filed July 8, 1965 3 Sheets-Sheet 3

3,400,224

TIME SCAN NETWORK SEARCH

Herbert Heitmann, Stuttgart-Feuerbach, Germany, assignor to International Standard Electric Corporation, a corporation of Delaware Filed July 8, 1965, Ser. No. 470,354
Claims priority, application Germany, July 17, 1964, St 22,424
7 Claims. (Cl. 179—18)

ABSTRACT OF THE DISCLOSURE

A network including a plurality of cascaded switching stages is scanned under the control of clock pulses. Each switch in a stage has a different timing cycle response characteristic so that every path is explored in sequence. When a path is completed, a feed back signal locks up the switch selected during the scan and blocks all competing paths.

Figure 1:
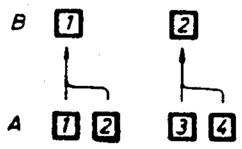

The invention relates to a multi-stage selecting circuit arrangement in which the selecting members within the stages are combined in groups and the selection is made in each group separately.

Such selecting circuit arrangements are used in telecommunication switching networks as line finders or distributors. For example, they may be used to connect a central facility to one of several lines or to selected ones of several available connecting lines, in order to establish a connection with a subscriber. The selecting members are associated with the lines which may be in either the busy or the available conditions; or they may be the transitory condition of a line having been requested. During such a transitory selection condition only one selecting member can become effective or started in order to preclude an operation of several selecting members simultaneously. Known circuit arrangements for so precluding such simultaneous operations are in the shape of a chain having members which consist of relays, electronic, bistable circuits or individual switching stages. These chain elements are successively interrogated as to their condition. They are also operated responsive to a pulse which is passed through them. This pulse is applied to the commencement of the chain and evaluated or formed again, depending on the condition of the individual chain elements, and then the pulse is advanced to the following chain element. The advanced pulse can start, however, only when the pulse belonging to the preceding chain member has ceased so that the maximum required selecting time is composed of the sum of the individual pulse periods.

In the selecting circuits of the aforementioned type, the selecting period can become inadmissibly long, particularly when a relatively large number of selecting members form a chain as is the case in selecting and offering signal in a guide wire system or in selecting storing units for connection with a central logical circuit. To offset such delay, efforts have been made to scanning frequency, but this causes difficulties in telecommunication systems. It is difficult to transmit short pulses on long, inter-connected lines without raising the noise level in common electronic facilities, the noise increasing with an increasing scanning frequency.

Moreover, known selecting circuits operate with so-called "arbitrary-selecting chains." The selection is not made in a predetermined sequence, but it is made on a basis that the first started selecting element responds and blocks all other selecting elements. If, however, several selecting elements are simultaneously marked by requesting signals, the conditions of these selecting elements may become instable, completely or for an indefinite time until one seletcing element finally succeds. In these chains an erroneous double seizing can occur; moreover, the selecting period cannot be exactly determined.

In order to prevent the chain from becoming too long at a large number of selecting elements, it is further known to combine the selecting elements into groups and to provide two cyclically advancing relay chains. One chain interrogates the selecting elements within each group in a first stage. The other chain interrogates the individual groups in a second stage. The arrangement is made so that the following group is marked only after the individual selecting elements within the first marked group have been successively interrogated. The disadvantage of an overly long selecting time remains, too.

In another multi-stage selecting circuit, known to the art, the selecting elements within the stages are combined in groups. Relays used as such selecting elements are provided with a switch-over device. The switch-over devices of a relay group form with their respective non-operated contacts, a contact chain, while a contact chain of a relay group of the subordinate stage is connected via their operated contacts. The selection within a group, responsive to a simultaneous excitation of several relays, is made in that only the relay with the lowest ordinal number advances the output signal through its associated crosspoint.

The selecting period is relatively short in such a multi-stage selecting circuit arrangement, but the output signal passes over a plurality of contacts, arranged in series. If now electronic means are substituted for relays which are succeptible to trouble, it becomes very difficult to operate the associated crosspoints.

An object of the invention is to provide a multi-stage selecting circuit with selecting elements combined into groups within the stages which, by using electronic switching means, permits a short selecting time (even if the number of selecting elements is relatively large), and which simultaneously enables a safe selection of one from among several selecting elements, simultaneously available or actuated. This is achieved according to the invention in that the selecting process in each group is made by means of timing circuits with different time constants, associated with the selecting elements.

When several selecting elements are actuated simultaneously within a group, the selecting element responds at first to the timing circuit which has the lowest time constant. It keeps itself unblocked, and blocks all other selecting elements of the same stage. Simultaneous actuations in different groups are always separated from the following stage. Locking elements are associated with the selecting elements of the stages following the first stage. Via the associated locking element, the first selecting element rendering an output signal within one group of these stages keeps the pertinent selecting elements of the first stage unlocked. Via the other selecting elements of the same group, it also locks the selecting elements associated with the first group.

Suitably each of the selecting stages is successively interrogated by a stage pulse releasing connection of the timing circuits. The selecting circuit thus becomes independent of the production tolerances of the elements. The timing circuits at the same point within the groups need not coincide exactly in their time constants. Moreover, the selecting speed can be modified. The scanning frequency can be substantially lower as compared with the arrangements known to the art in which all selecting elements are successively scanned. Thus, the noise level in the exchange systems remains sufficiently low. The duration of each stage pulse is selected so that, within such a pulse duration, the timing circuit having the maximum time constant can give a potential, sufficiently high to actuate the following device. The selecting elements are advantageously made so that the connection of the timing circuits is permitted only upon termination of the stage pulse.

Figure 2:
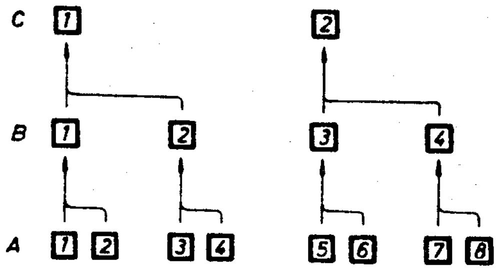
Figure 3:
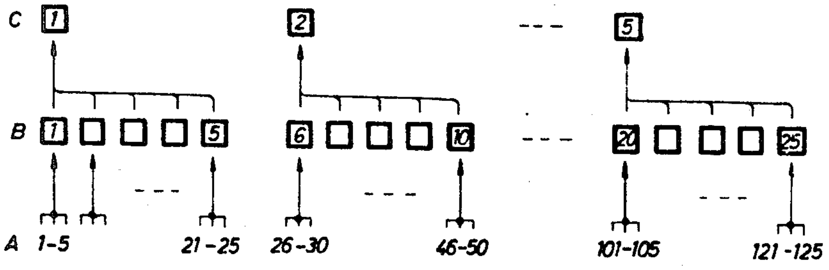
Figure 4:
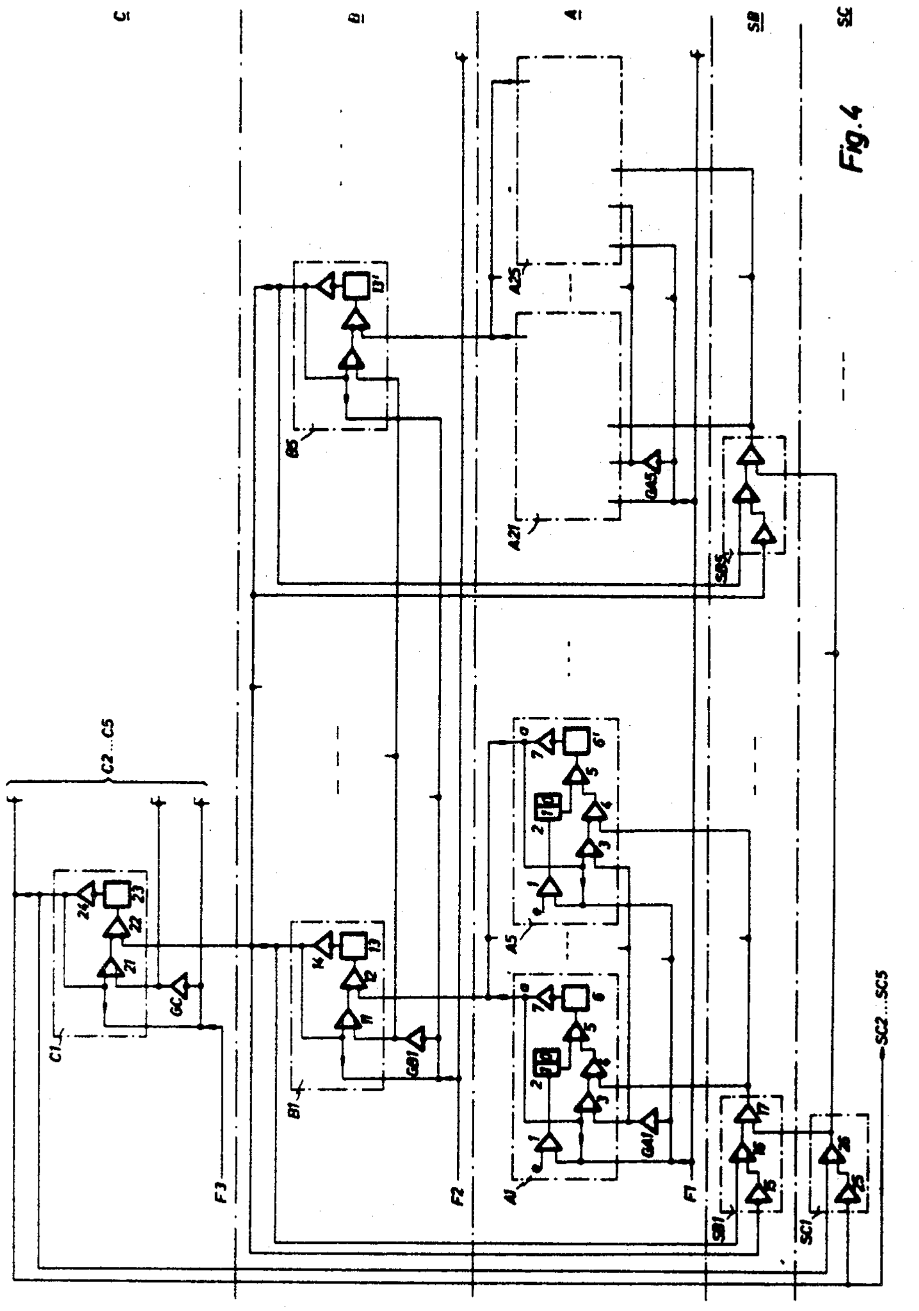
Figure 5:
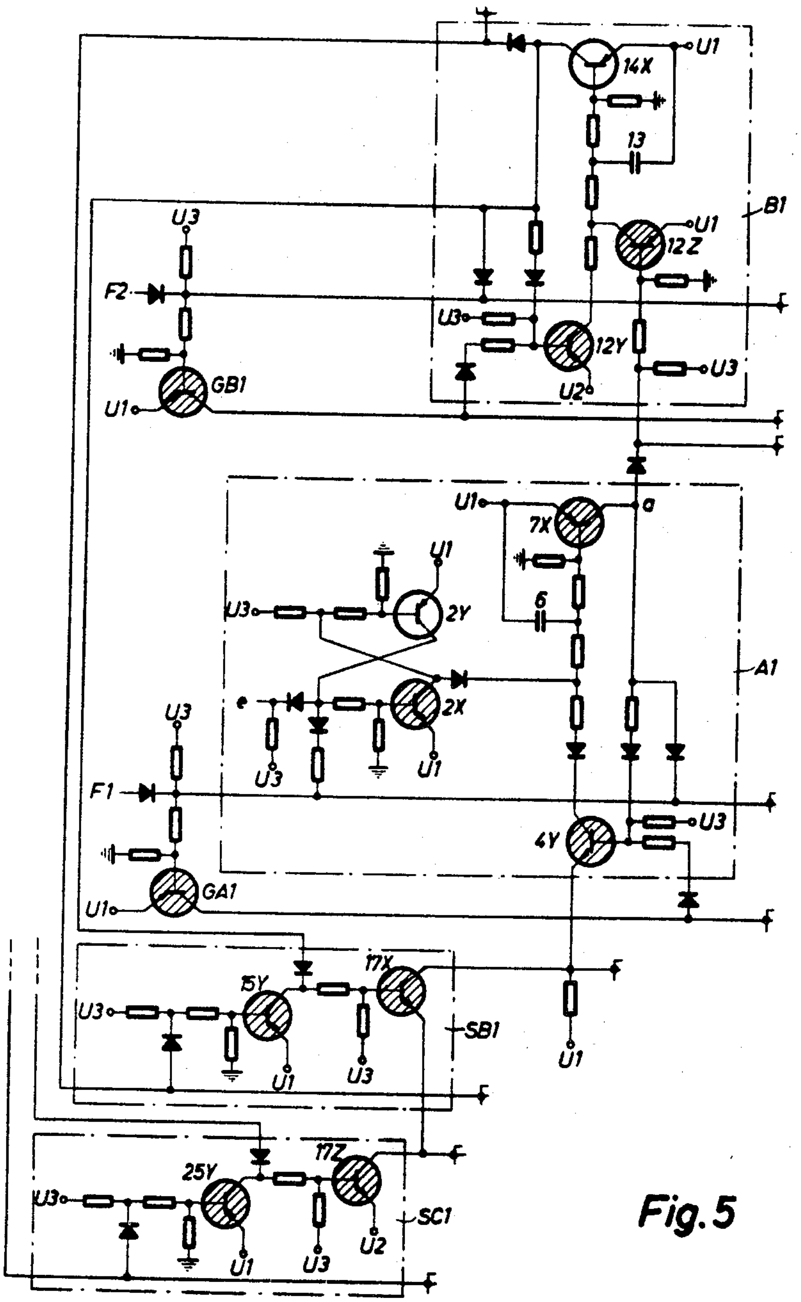

The invention is now explained in detail with reference to examples of embodiment, shown on the accompanying drawings, wherein:

FIGS. 1, 2, 3 show schematically some selecting circuit arrangements with different grouping of the selecting elements, FIG. 4 shows a selecting circuit according to FIG. 3, and FIG. 5 shows the arrangement of the selecting and locking elements according to FIG. 4, equipped with transistors.

FIG. 1 shows the most simple selecting circuit according to the invention. Four selecting elements are provided in a first selecting stage A, and they are combined into two groups, each with two selecting elements A1, A2 and A3, A4 respectively. A second selection stage B shows two selecting elements B1, B2. The selecting elements A1, A2 act upon the selecting element B1, and the selecting elements A3, A4 act upon the selecting element B2. The selecting elements of the stage A can be associated e.g. with the connecting links of a telephone exchange which requests a centrally arranged device. The selecting elements of each group contain timing circuits with different time constants, whereby different operating speeds of the selecting elements are obtained. Thus, if several selecting elements are actuated simultaneously, the one with the lower time constant succeeds over the other ones.

It is also possible to provide more than two stages and more than two selecting members within a group. FIG. 2 shows a three-stage selecting arrangement with two selecting members in each group. FIG. 3 shows a selecting circuit arrangement with three stages A, B, C, and five selecting members per group. With the selecting arrangement according to FIG. 3, a selection one from among 125 connecting links can be made.

FIG. 4 shows, in detail, the selecting member C1 and parts of the pertinent members B1 to B5 and A1 to A25 arranged according to FIG. 3. The selecting members A1 to A5 act upon the selecting member B1. The members A21 to A25 act upon the selecting element B5. The selecting members B1 to B5, in turn, act upon the selecting member C1. Each selecting circuit of the first stage A contains an AND-circuit 1. One input *e* of this circuit can be fed a request signal. The other input of AND-circuit 1 can be fed by a stage pulse F1 which interrogates all selecting members of stage A. The AND-circuit 1 controls the bistable circuit 2 which furnishes, in its normal condition, a signal to its "1"-output. The output of circuit 2 is connected to a first input of a first OR-circuit 5, the output of which is connected to an inverter 7 via a timing circuit 6 or 6', resspectively. The timing circuits within each group of stage A have different time constants. For example, the timing circuit 6 in the selecing member A1 should have the shortest time constant, and the timing circuit 6' in the selecting member A5 should have the lowest time constant. The same time relationship applies correspondingly to groups A21 to A25 and all other groups of stage A. The time constants of the timing circuits at corresponding points within the groups do not have to coincide. For example, the timing circuits 6 in the selecting members A1 and A21 need not coincide exactly.

The stage pulse F1 further influences the second input of the first OR-circuit 5 via an inverter GA. This inverter is common to each group of selecting members such as A1–A5. The stage pulse F1 is also applied to both a second OR-circuit 3 and in turn, to an inverted AND-circuit 4. The second input of the inverted AND-circuit 4 is controlled by pertinent locking members SB, SC. The output *a* of the inverter 7, forms the output of the selecting member, and it is fed back to the second input of the OR-circuit 3. This feed back influences together with all other outputs in the same group, the input of the common inverter GA. The common converter GA1 is assigned to the groups A1 to A5, and the common inverter GA5 is assigned to the groups A21 to A25. Arrows indicate the only direction in which the signal can be transmitted.

Each selecting member of stage B contains an OR-circuit 11, an inverted AND-circuit 12, a timing element 13 or 13', respectively and an inverter 14 connected in series, with the second input of the inverted AND-circuit 12 being controlled by the pertaining selecting members of stage A. The timing circuits of the selecting members B1 to B5, combined in a group, also have different time constants. For example, the timing circuit 13 can have the shortest time constant, and the timing circuit 13', the longest time constant. A stage pulse F2 interrogates all selecting members of stage B, influences the first input of the OR-circuit 11 via an inverter GB (GB1), common to always one group of selecting members of stage B, with the second input of the OR-circuit 11 being connected to the output of the inverter 14. The inverter 14 also influences the common inverter GB1.

The selecting members of stage C are arranged with their circuits 21, 22, 23, 24 connected in the same manner as corresponding circuits in the selecting members of stage B, and they are controlled via a common inverter GC by a stage pulse F3. Again, this pulse interrogates all selecting members of stage C by acting jointly with the output of the pertinent selecting members (B1 to B5) of stage B.

To each selecting member of stages B and C there is assigned a locking member SB and SC respectively. The locking member SB1 is associated with the selecting member B1, the locking member SB5 with the selecting member B5, and the locking member SC1 with the selecting member C1. The locking members SB include, series-connected, an inverter 15, an OR-circuit 16, and an AND-circuit 17 connected to the lowermost input of the inverted AND-circuits 4 of the pertinent selecting members in stage A. The outputs of the selecting members of stage B are individually connected to the secondary inputs of the OR-circuits 16. All outputs of the selecting members of a group in stage B act in common upon all inverters 15 of the locking members (SB1 to SB5). In a corresponding manner, the locking members SC include series connected with the inverter 25 and an OR-circuit 26, and they are driven responsive to the output of the selecting members of stage C. Thus, the output of the OR-circuit 26 is fed to the secondary inputs of the pertinent AND-circuits 17.

In the following, there is explained the mode of operation of the three-stage selecting circuit. A "yes" information is equal to a signal or to the condition "energized," whereas a "no" information means no signal or "not energized."

In normal condition, the inverters 7, 14, 24 furnish no output signal, since the bistable circuits 2 are energized at the output end. Because the inverters 14, 24 furnish no signal, the OR-circuits 16, 26 render a signal to the AND-circuit 17 which, in turn, energizes the secondary inputs of the inverted AND-circuits 4. The first input of circuit 4 is energized by the common inverter GA via the OR-circuit 3, because no stage pulse has yet been applied at the input of the inverter. Since both inputs of the inverted AND-circuit 4 are thus energized no signal is furnished at its output. It is now assumed that two selecting members A1, A5 have been started simultaneously at their inputs *e*. At the commencement of the stage pulse F1 the AND-circuits 1 are actuated in coincidence and the bistable circuits 2 trigger over so that the signals at the first inputs of the OR-circuits 5 are switched off. Upon commencement of the control pulse, the signals to the first inputs of the inverted AND-circuits 4 are switchd off via the common inverter GA1 and via the OR-circuits 3, so that these inverted AND-circuits 4 furnish an output signal thus at first maintaining (via the OR-circuits) 5 the condition of both the timing circuits 6, 6′ and the inverter 7.

After the end of the stage pulse F1 a signal re-appears at the first input of the inverted AND-circuits 4 which therefore render no output signal. Because at that moment both inputs of the OR-circuits 5 are not energized no signals appear at their outputs. From that moment onwards the timing circuits 6, 6′ are effectively operating. For example, a capacitor of the timing circuit starts to be charged, until a potential is obtained at the output of the timing circuit which permits the switching over of the inverter 7.

According to the presuppositions, the timing circuits 6, 6′ have different time constants. Therefore, the inverter 7 in the selecting member A1 responds first, and (A) actuate a holding circuit via the OR-circuit 3, the inverted AND-circuit 4, the OR-circuit 5, and the timing circuit 6, and (B) trigger the common inverter GA1 which thereby disconnects the signal at the first input of the inverted AND-circuit 4 in the selecting member A5. By this measure, the timing circuit 6′ is again switched off before being capable of of triggreing the pertinent inverter 7.

It is now assumed that two selecting members which are in different groups of the stage A receive a request signal *e* at the same time. For example, the selecting members A1 and A21 may act at the same time. Upon commencement of the stage pulse F2, immediately following the stage pulse F1, the input signal at the first inputs of the inverted AND-circuits 12 are switched off via the common inverter GB1 and via the OR-circuits 11 in the selecting members B1 to B5, so that the timing circuits 13, 13′, and the inverter 14 remain in normal condition. The conditions of the timing circuits 13, 13′ and of the inverter 14 do not change if, during the stage pulse F2, the output signal of the selecting member A1 or A21, respectively appears at the secondary inputs of the inverted AND-circuits 12. Only after the end of the stage pulse F2, a signal is again applied from the common inverter GB1 to the inverted AND-circuits 12, via the OR-circuits 12. At that moment, both inputs of the AND-circuits 12 are excited, so that the timing circuits 13, 13′, having different time constants, are switched. One of these timing circuits is the quickest one, e.g. the timing circuit 13, and it responds at first and triggers the pertinent inverter 14. The new condition of the inverter 14 is maintained through the circuits 11, 12, 13; the output signal of the inverter 14 in the selecting member B1 disconnects the timing circuit 13′ again via the common inevrter GB1 before the pertinent inverter can trigger over.

The signal at the output *a* of the selecting member A21 must not be maintained, because only on selecting member in the stage A should have an output signal after completion of the scanning with the stage pulses F1, F2, F3. In order to through-connect the link, only one selecting member should operate in each stage. In order to disconnect the output signal of the selecting member A21, the output signal of the inverted 14 (B1) is fed in to the inverters 15 and to the second input of the OR-circuit 16 in the locking member SB1. Thereby both inputs of the AND-circuit 17 in the locking member SB1 remain excited, so that the condition of the selecting member A1 remains unchanged. At the inputs of the AND-circuit in the locking member SB5, no coincidence prevails, so that in the selecting member A21 the inverter 7 is again brought into a normal condition via the corresponding circuits 4, 5, 6.

In a similar way as in stage B, requests are separated in the stage C, in as far as, for example, the selecting member A1, belonging to the selecting member C1 and the selecting member 121, pertaining to the selecting member C5, but not shown on the drawing, have been actuated simultaneously.

The output signal of the selecting member C1 responding first is individually fed to the second input of the OR-circuit 26 in the locking member SC1 and to the inverter 25 in all locking members SC1 to SC5. Thus, only one selecting member of the selecting members of the first stage A, pertaining to the selecting member C1 remain in a responsive condition. All other selecting members of the first stage A are blocked.

Examples relating to the logical circuits according to FIG. 4 are shown in FIG. 5. The selecting members A1, B1, the common inverters GA1, GB1 and the locking members SB1, SC1 are equipped with transistors. The normally conductive transistors are shown as cross-hatched. The potentials U1, U2, U3 are negative. Thus, the magnitude of the potentials approximately corresponds to the numerical value.

The common inverters GA1, GB1 are simple transistor switching stages, the transistors of which are kept conductive in normal condition. The stage pulse F1 or F2, respectively, are applied as ground pulses to make these transistors non-conductive.

The inverted AND-circuit 4 in the selecting member A1 is formed by a npn-type transistor 4Y, kept conductive during normal condition. This transistor is controlled at its base from the collector of the pnp-type transistor GA1 or from the collector of a pnp-type transistor 7X, belonging to the inverter 7. The transistor 4Y is controlled at the emitter by the two npn-type transistors 17X, 17Z which are series-connected with the AND-circuit 17. The collector of transistor 4Y is connected with the timing circuit 6, consisting of resistors and a capacitor. This timing circuit is arranged within the base circuit of the switching stage 7X. To the timing circuit 6, the bistable circuit 2 is connected. This circuit includes two pnp-type transistors 2X, 2Y, which can be controlled via an AND-circuit 1, consisting of diodes, from the input *e* and by the stage pulse F1. The normally conductive transistor 2X is arranged parallel in relation to the timing circuit capacitor 6. When the transistor 2X is non-conductive the transistor 4X takes over to start the timing circuit 6 in that it leads the potential U2 arriving over the transistors 17Z, 17X to the timing circuit.

The inverted AND-circuit 12 in the selecting member B1 is formed by an npn-type transistor 12Y inserted into the charging circuit of a timing circuit 13. The timing circuit includes resistors and a capacitor, and a pnp-type transistor 12Z, located in parallel to the timing circuit capacitor. Transistor 122 is controlled at the base by the selecting member A1. The transistor 12Y is controllable at its base by the collector of the pnp-type transistor GB1 or by the collector of the pnp-type transistor 14X, forming the inverter 14.

The inverters 15, 25 in the locking members SB1, SC1 are formed by simple switching stages with the pnp-type transistors 15Y, 25Y. These transistors 15Y, 25Y or the transistors of the inverters in the pertinent selecting members B1 or C1 respectively, connected via diodes, control the transistors 17X, 17Z.

I claim:

1. An automatic switching, multi-stage selecting circuit comprising a plurality of selecting members arranged in successively cascaded stages, each stage in said cascade having a number of parallel selecting members for offering alternative switching path options, means at each stage for self-selecting one of the parallel members at that stage, and timer means at each of said parallel members for causing said members to select themselves with a given order of preference.

2. The circuit of claim 1 and means for applying interrogation and demand pulses to each of said stages for causing said self-selection of said selecting members.

3. The circuit of claim 2 wherein the pulse continues for a period of time which is long enough to insure response by the slowest of said timer means.

4. The circuit of claim 3 and means responsive to termination of said pulse perfecting said self-selection.

5. The circuit of claim 1 and means whereby the one of said selecting members which selects itself first gives an output signal, keeps itself unlocked, and blocks self-selection by all other of said selecting members in the same stage.

6. The circuit of claim 5 and locking means, means associated with succeeding stages in said cascade, means for giving said output signal via said locking means, and means responsive to signals given via said locking means for keeping unlocked the selecting members in the first stage in said cascade while blocking said other selecting members.

7. The selecting circuit of claim 1 and means in each member in a first cascaded stage for controlling said self-selection comprising means responsive jointly to a stage identification signal and a connection requesting signal for providing an off normal bistable output, means responsive to termination of at least one of said signals for measuring a period of time, and means effective after said measured period of time for blocking all except the self-selected path.

References Cited

UNITED STATES PATENTS

| | | | |
|---|---|---|---|
| 3,051,793 | 8/1962 | Hiller et al. | 179—18.7A |
| 3,319,009 | 5/1967 | Regnier et al. | 179—18.7 |
| 3,336,443 | 8/1967 | Ben Mussa et al. | 179—22 |

KATHLEEN H. CLAFTY, *Primary Examiner.*

LAWRENCE WRIGHT, *Assistant Examiner.*